(12) United States Patent
Wong

(10) Patent No.: US 7,558,967 B2
(45) Date of Patent: Jul. 7, 2009

(54) ENCRYPTION FOR A STREAM FILE IN AN FPGA INTEGRATED CIRCUIT

(75) Inventor: Wayne Wong, Sunnyvale, CA (US)

(73) Assignee: Actel Corporation, Mountain View, CA (US)

( * ) Notice: Subject to any disclaimer, the term of this patent is extended or adjusted under 35 U.S.C. 154(b) by 583 days.

(21) Appl. No.: 09/953,580

(22) Filed: Sep. 13, 2001

(65) Prior Publication Data

US 2003/0163715 A1    Aug. 28, 2003

(51) Int. Cl.
*H04L 9/18* (2006.01)

(52) U.S. Cl. .......................... 713/189; 716/16; 716/17; 326/8; 326/38; 326/39; 713/191; 713/193

(58) Field of Classification Search ............. 716/16–17; 326/8, 37–41, 4, 44; 380/44, 42, 37; 708/232, 708/626; 712/206; 713/191, 188, 189, 193
See application file for complete search history.

(56) References Cited

U.S. PATENT DOCUMENTS

| | | | | |
|---|---|---|---|---|
| 4,910,417 A | | 3/1990 | El Gamal et al. ............. | 307/465 |
| 5,388,157 A | | 2/1995 | Austin ........................... | 380/4 |
| 5,406,627 A | * | 4/1995 | Thompson et al. .......... | 380/237 |
| 5,426,379 A | * | 6/1995 | Trimberger ................... | 326/39 |
| 5,451,887 A | | 9/1995 | El Avat et al. ................. | 326/39 |
| 5,515,437 A | * | 5/1996 | Katta et al. ................... | 380/217 |
| 5,548,648 A | * | 8/1996 | Yorke-Smith ................ | 713/193 |
| 5,675,553 A | | 10/1997 | O'Brien, Jr. et al. ......... | 367/135 |
| 5,768,372 A | | 6/1998 | Sung et al. | |
| 5,946,478 A | * | 8/1999 | Lawman ....................... | 716/17 |
| 5,970,142 A | | 10/1999 | Erickson ...................... | 380/21 |
| 6,028,445 A | * | 2/2000 | Lawman ....................... | 326/38 |
| 6,118,869 A | * | 9/2000 | Kelem et al. ................. | 380/44 |
| 6,205,574 B1 | * | 3/2001 | Dellinger et al. ............. | 716/16 |
| 6,351,142 B1 | * | 2/2002 | Abbott ......................... | 326/39 |
| 6,357,037 B1 | * | 3/2002 | Burnham et al. ............. | 716/17 |
| 6,446,242 B1 | * | 9/2002 | Lien et al. ..................... | 716/6 |
| 6,507,943 B1 | * | 1/2003 | Kelem ......................... | 716/16 |

(Continued)

FOREIGN PATENT DOCUMENTS

EP          1093056        *   4/2001

(Continued)

OTHER PUBLICATIONS

Microsoft Press Computer Dictionary, 3rd edition, Copyright 1997, p. 421.*

(Continued)

*Primary Examiner*—Kambiz Zand
*Assistant Examiner*—Yin-Chen Shaw
(74) *Attorney, Agent, or Firm*—Lewis and Roca LLP

(57) ABSTRACT

A system for encrypting and decrypting data in a data stream for programming a Field Programmable Gate Array (FPGA). The system allows for an enable bit to be set for a gap in the data stream and the data is then encrypted from the beginning of the gap. A gap being bits in said data stream that correspond to unprogrammed addresses of a memory in the field programmable gate array. The data is then decrypted by the FPGA when the bit stream is received and an enable bit is detected in a gap of the data stream.

30 Claims, 4 Drawing Sheets

U.S. PATENT DOCUMENTS

| | | | |
|---|---|---|---|
| 6,526,557 B1 * | 2/2003 | Young et al. | 716/16 |
| 6,654,889 B1 * | 11/2003 | Trimberger | 713/191 |
| 6,735,291 B1 * | 5/2004 | Schmid et al. | 379/189 |
| 6,738,962 B1 * | 5/2004 | Flaherty et al. | 716/17 |
| 6,756,811 B2 * | 6/2004 | Or-Bach | 326/41 |
| 6,904,527 B1 * | 6/2005 | Parlour et al. | 713/189 |
| 6,931,543 B1 * | 8/2005 | Pang et al. | 713/193 |
| 2001/0032318 A1 * | 10/2001 | Yip et al. | 713/190 |
| 2001/0056546 A1 * | 12/2001 | Ogilvie | 713/200 |

FOREIGN PATENT DOCUMENTS

| | | |
|---|---|---|
| JP | 05056267 A | 3/1993 |
| JP | 7-281596 A | 10/1996 |
| JP | 2000-76075 A | 3/2000 |
| JP | 2000-78023 A | 3/2000 |
| JP | 2005-518691 A | 6/2005 |

OTHER PUBLICATIONS

Glenn, R. and Kent, S., "The NULL Encryption Algorithm and Its Use with IPsec," RFC 2410, Network Working Group, Nov. 1998, UR http://www.faqs.org/ftp/rfc/pdf/rfc2410.txt.pdf, 6 pages.

Japanese Patent Application No. 2003-527602 (Publicatiion No. 2005-518691) Notice of Allowance and English translation of Information Sheet for prior art listed in Notice of Allowance dated Sep. 30, 2008, 4 pages.

* cited by examiner though ENCRYPTION FOR A STREAM FILE IN AN FPGA INTEGRATED CIRCUIT

BACKGROUND OF THE INVENTION

1. Field of the Invention

The present invention relates to field programmable gate array (FPGA) integrated circuits. More particularly, the present invention relates to a method and apparatus for encrypting a data stream used to program an FPGA device.

2. Background of the Invention

A field-programmable gate array (FPGA) is an integrated circuit (IC) that includes a two-dimensional array of general purpose logic circuits, called cells or blocks, whose functions are programmable. The cells are linked to one another by programmable buses. The cell types may be small multifunction circuits (or configurable functional blocks or groups) capable of realizing all Boolean functions of a few variables. The cell types are not restricted to gates. For example, configurable functional groups typically include memory cells and connection transistors that may be used to configure logic functions such as addition, subtraction, etc., inside of the FPGA. A cell may also contain sequential elements such as flip-flops. Two types of logic cells found in FPGAs are those based on multiplexers and those based on programmable read only memory (PROM) table-lookup memories. Erasable FPGAs can be reprogrammed many times. This technology is especially convenient when developing and debugging a prototype design for a new product and for manufacture.

FPGAs may typically include a physical template that includes an array of circuits, sets of uncommitted routing interconnects, and sets of user programmable switches associated with both the circuits and the routing interconnects. When these switches are properly programmed (set to on or off states), the template or the underlying circuit and interconnect of the FPGA is customized or configured to perform specific customized functions. By reprogramming the on-off states of these switches, an FPGA can perform many different functions. Once a specific configuration of an FPGA has been decided upon, it can be configured to perform that one specific function.

The user programmable switches in an FPGA can be implemented in various technologies, such as Oxide Nitrogen Oxide (ONO) antifuse, Metal- Metal (M-M) antifuse, Static Random Access Memory (SRAM) memory cell, Flash Erasable Programmable Read Only Memory (EPROM) memory cell, and electronically Erasable Progammable Read Only Memory (EEPROM) memory cell. FPGAs that employ fuses or antifuses as switches can be programmed only once. A memory cell controlled switch implementation of an FPGA can be reprogrammed repeatedly. In this scenario, a NMOS transistor may be used as the switch to either connect or leave unconnected two selected points (A,B) in the circuit. The source and drain nodes of the transistor may be connected to points A, B respectively, and its gate node may be directly or indirectly connected to the memory cell. By setting the state of the memory cell to either logical "1" or "0", the switch can be turned on or off and thus point A and B are either connected or remain unconnected. Thus, the ability to program these switches provides for a very flexible device.

FPGAs may store the program that determines the circuit to be implemented in a RAM or PROM on the FPGA chip. The pattern of the data in this configuration memory (CM) determines the cell's functions and their interconnection wiring. Each bit of CM controls a transistor switch in the target circuit that can select some cell function or make (or break) some connection. By replacing the contents of CM, designers can make design changes or correct design errors. The CM can be downloaded from an external source or stored on-chip. This type of FPGA can be reprogrammed repeatedly, which significantly reduces development and manufacturing costs.

Design software may be used to program the FPGA. The design software may compile a specific configuration of the programmable switches desired by the end-user, into FPGA configuration data. The design software assembles the configuration data into a bit stream, i.e., a stream of ones and zeros, that is fed into the FPGA and used to program the configuration memories for the programmable switches. The bitstream is the data-pattern to be loaded into the CM that determines whether each memory cell stores a "1" or "0". The stored bit in each CM controls whether its associated transistor switch is turned on or off. End users typically use software to create the bitstream after they have simulated and, tested the design for the FPGA.

Referring to the flow chart of FIG. 1, a designer or end user programs an FPGA 100. The design software assembles the configuration data into a data stream 110. This act may also be performed by software personnel. The data stream may be stored on a source external to the FPGA 120. On start up, the external source sends the data stream to the FPGA 130. Once in the FPGA, the data stream configures the RAM or PROM within the FPGA.

In a FPGA that uses a data stream that is downloaded from an external source, a person may be able to intercept the data stream as it is being loaded onto the FPGA, between acts 120 and 130 of FIG. 1. This may allow such a person to reverse engineer the IC if he or she is able to read the data stream.

BRIEF DESCRIPTION OF THE INVENTION

The present invention is directed towards a method and apparatus for encrypting a data stream used to program an FPGA device comprising: determining if there is at least one gap in the data stream; determining whether encryption is enabled for the at least one gap in the data stream; and encrypting the data stream, if encryption is enabled for the at least one gap.

The present invention is also directed towards a method and apparatus for de-encrypting an encrypted data stream used to program an FPGA device comprising: determining if there is at least one gap in the data stream; determining whether encryption was enabled for the at least one gap in the data stream; and de-encrypting the data stream, if encryption was enabled for the at least one gap.

BRIEF DESCRIPTION OF THE DRAWING FIGURES

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

Figure 1:
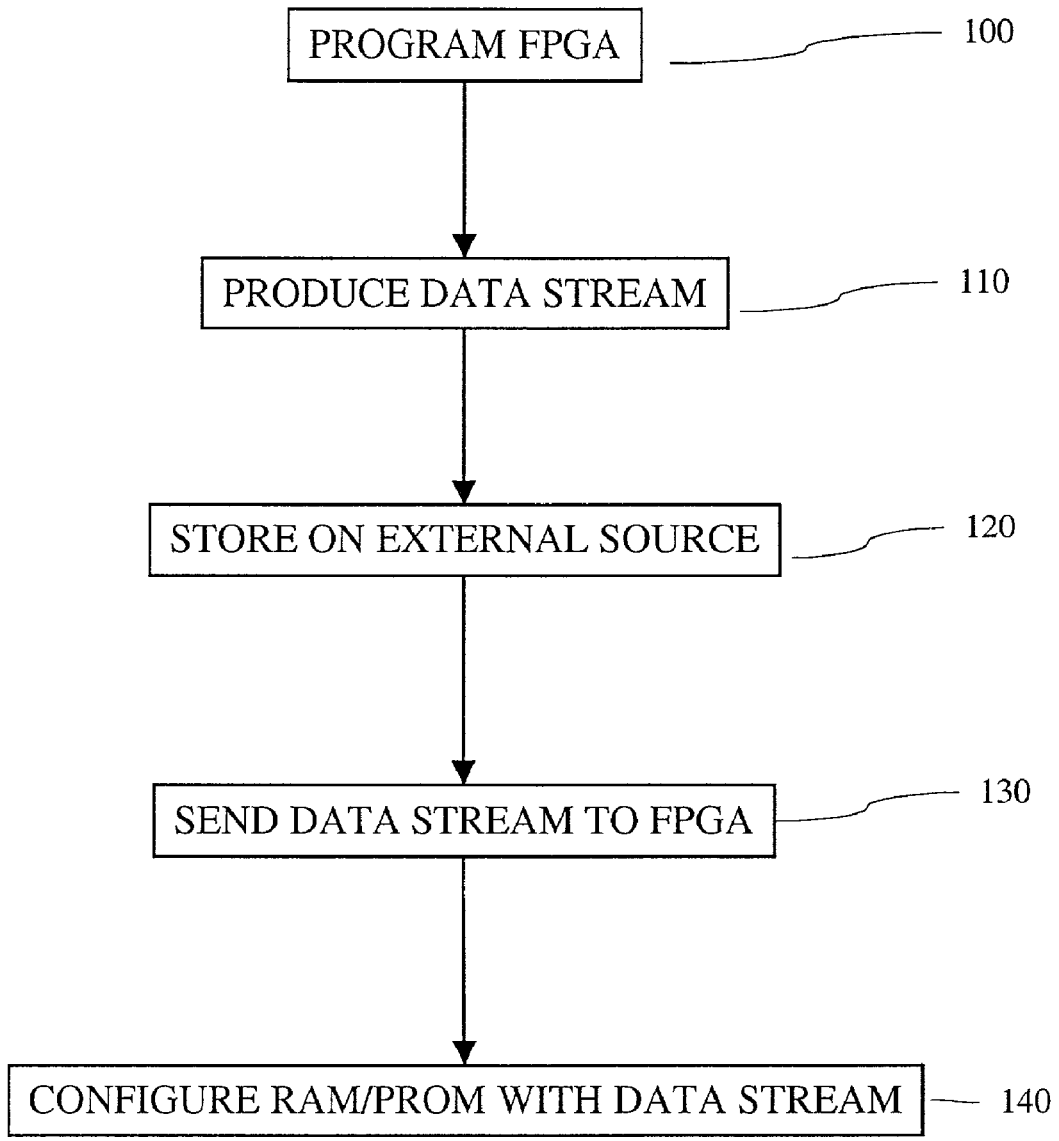
FIG. 1 is a flow chart showing the prior art.
Figure 2:
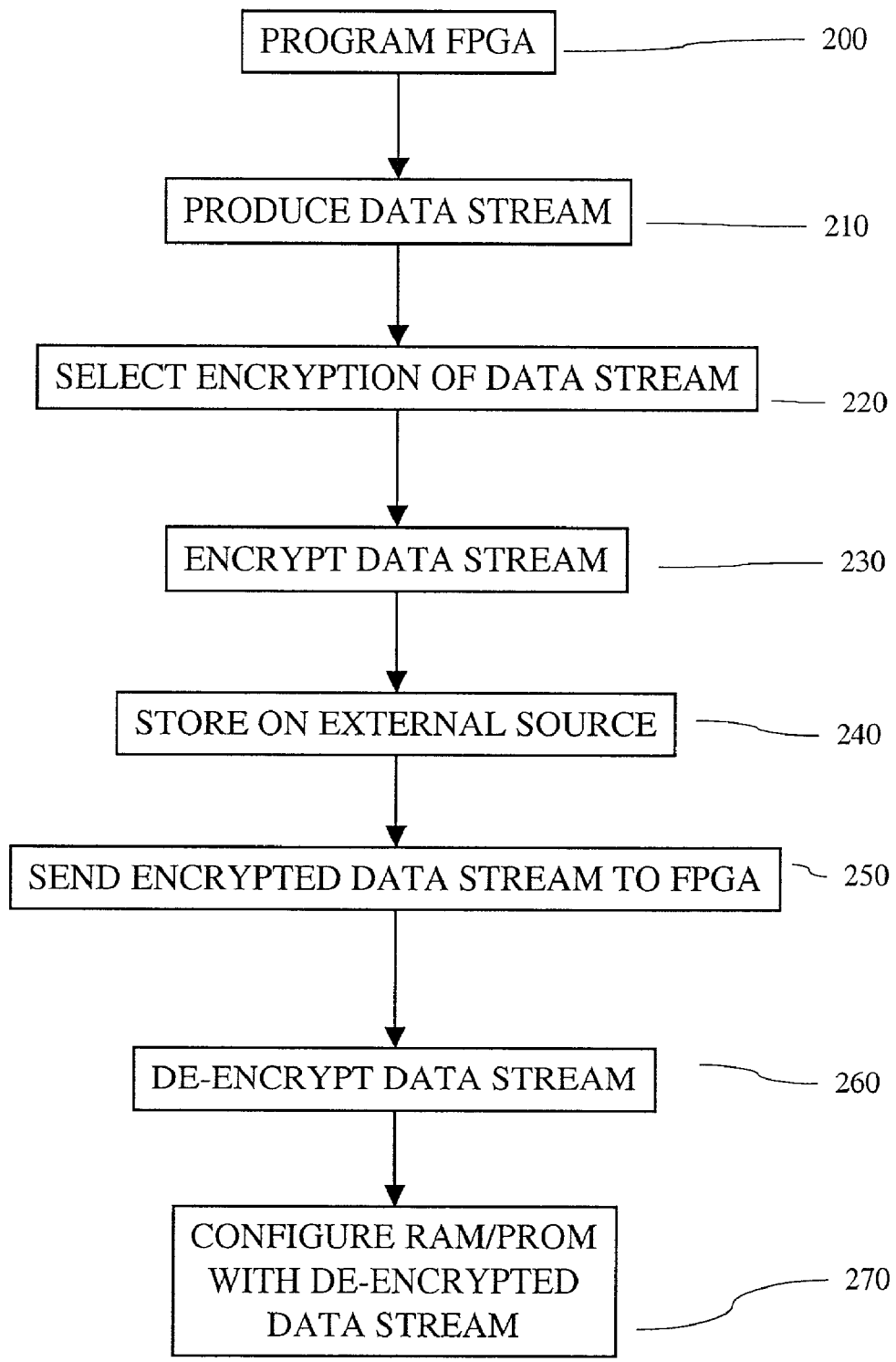
FIG. 2 is a flow chart showing one embodiment of the disclosed system.

FIG. 2 refers to a flow chart describing one embodiment of the disclosed method. In the first act 200 a designer or user programs an FPGA 200. The design software assembles the configuration data into a data stream 210. The design software may inquire as to whether the designer or the user wishes to have the data stream encrypted. If the designer or user wants the data stream to be encrypted, then he or she may select the option for encryption at act 220. The data stream is encrypted at act 230. This act 230 may also be performed by software personnel. The data stream may be stored on a source external to the FPGA 240. The external data source may be a PROM, CPU or any other memory device. On start-up, the external source sends the data stream to the FPGA 250. The FPGA may de-encrypt the data stream prior to configuring the RAM or PROM 260. Once de-encrypted, the data stream configures the RAM or PROM within the FPGA 270. The RAM associated with each programmable transistor on the FPGA may also be referred to as RAM CELLS.

In many systems, the data stream is loaded into CM which is addressed by X and Y address lines running horizontally and vertically. During the configuration, the data stream bits are loaded sequentially column (Y) by column (Y). Within one column, it is loaded bit by bit from the top to the bottom (stepping through all the rows or X's). Some intersections of X and Y lines or addresses may have no physical CM bits since those locations may be used by logic modules or other components. Although there may be locations with no data stream bits on the FPGA device, the data stream still contains data in the form of 1's or 0's corresponding to those empty locations.

Consecutive empty locations in the addressing space may be referred to as a "GAP". The stream data inside the gap is not written to the CM and therefore has no effect on the functionality of the configured FPGA. An address decoder may signal the beginning and also the end of such a gap. At the end of the gap, the integrity of the configuration data loaded up to this point may be checked by an on-chip 16-bit Cyclic Redundancy Check (CRC) circuit. In another embodiment of the disclosed system that uses a 16-bit CRC, the minimum gap size may be 17 bits. The first bit inside the gap may be the "Encryption Enable" bit. If the Encryption Enable bit is set, then the subsequent section of the data stream will be encrypted. The section may be defined as all the bits after the Encryption Enable Bit up to the beginning of the next gap. However, the sections may be defined in other ways. If encryption is enabled, every eighth (8th) bit may be complemented (changed from a "1" to a "0" and from a "0" to a "1"). It is not necessary that only the $8^{th}$ bit be complemented, other bits may be complemented, random patterns or un-random patterns of data may be inserted in the data stream gaps. If the encrypted data stream is loaded into the CM of the FPGA, the FPGA may not function correctly. Thus the data stream may be de-encrypted prior to entering the CM but after entering the FPGA device. The encryption can be optionally set to "on" or "off" for each section, thus for a particular design, with a different on/off setting the data stream file can appear very different, thereby making reverse engineering more difficult.

Figure 3:
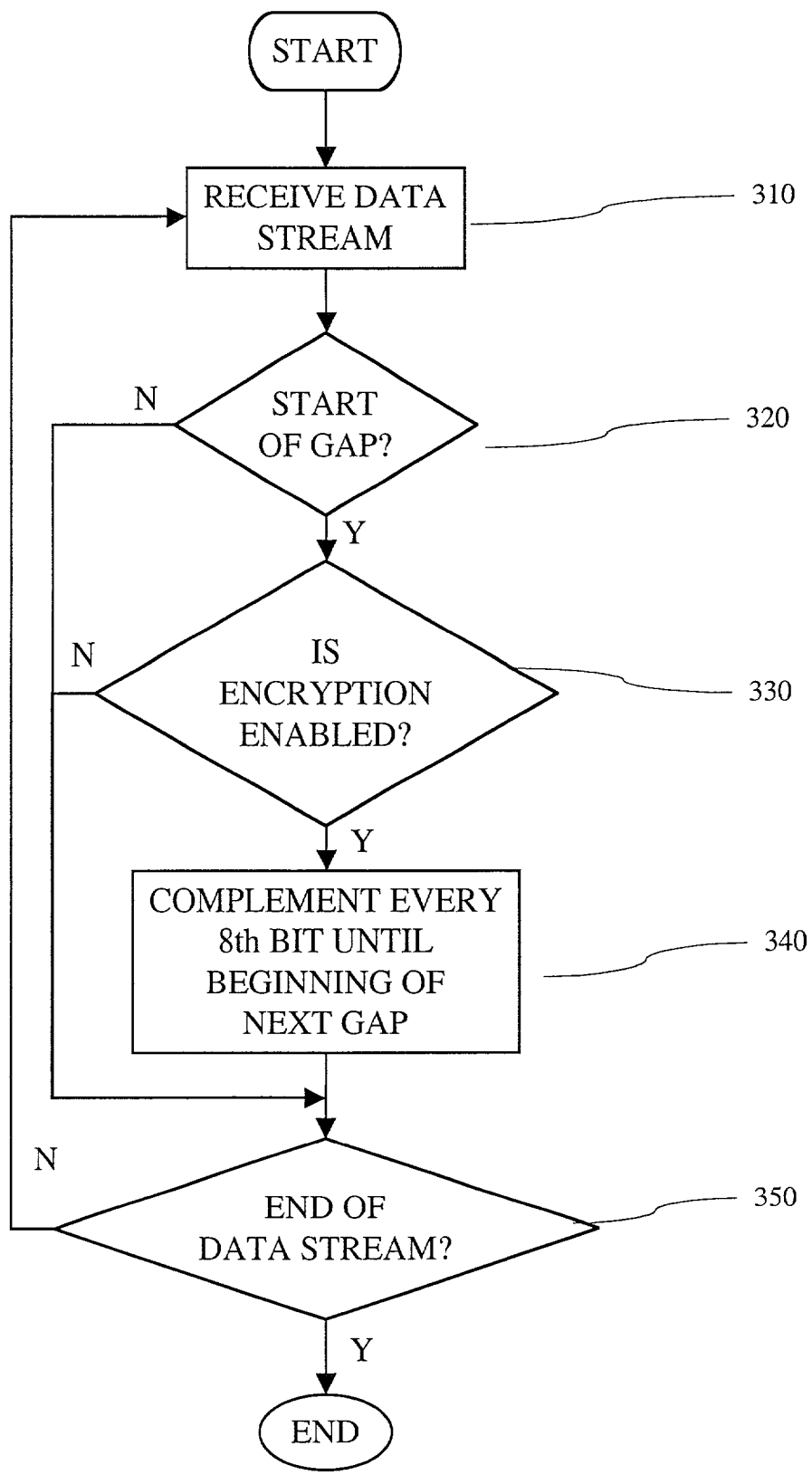
FIG. 3 is a flow chart showing one embodiment of the disclosed system.

Referring to FIG. 3, an illustration of one embodiment of the system is shown. The system receives the data stream at act 310. The system determines whether it has received the start of a gap at query 320. In one embodiment of the disclosed system a gap may be as small as 2 bits. In another embodiment of the disclosed system, a gap may be at least 17 bits in length upwards to at least 64 bits in length. The minimum of 17 bits may be due to the use of a 16-bit CRC. The system then determines whether encryption has been enabled for that gap at query 330. If encryption has been enabled, the system then complements every $8^{th}$ bit until the beginning of the next gap at act 340. The system performs this method until it determines that it has reached the end of the data stream at query 350.

Figure 4:
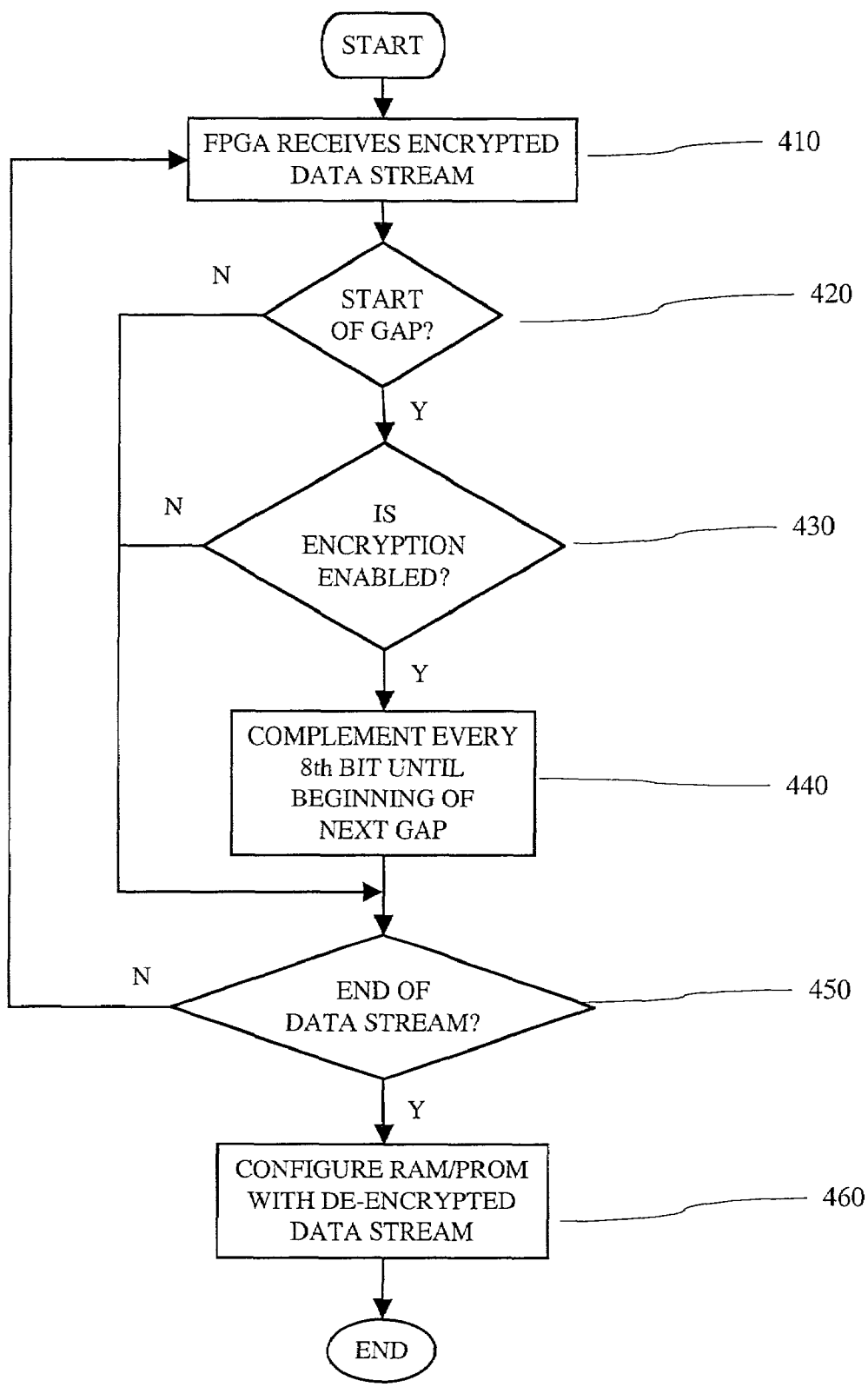
FIG. 4 is a flow chart showing one embodiment of the disclosed system.

Referring to FIG. 4, another embodiment of the disclosed method is shown. The FPGA receives the encrypted data stream from the external source at act 410. The system then determines that if it has received the start of a gap at query 420. If the system determines it has received the start of a gap, then the system determines whether the encryption was enabled at query 430. If the encryption was enabled, the system complements every $8^{th}$ bit (or other $n^{th}$ bit if a number other than 8 was used) until the beginning of the next gap at act 440. Act 440 in effect de-encrypts the data stream. The system then determines whether it has received the end of the data stream at query 450. If the system determines that it has received the end of the data stream, then the system configures the RAM and/or PROM of the FPGA with the de-encrypted data stream at act 460.

In another embodiment of the present invention, portions of the data stream may be compressed and other portions of the data stream may be encrypted, thereby further altering the data stream and thus hindering those who may attempt to reverse engineer the data stream.

In another embodiment of the present invention, random bits may be inserted into the gaps of the data stream to further hinder those who may wish to reverse engineer the data stream.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims. Although the claims refer to sending the data stream to RAM CELLS on the FPGA, those skilled in the art are aware that the disclosed system also applies to those devices with other memory devices located in the FPGA, including without limitation PROMs.

What is claimed is:

1. A method for encrypting a data stream used to program a field programmable gate array comprising:

receiving said data stream wherein said data stream is a string of bits;

detecting a first gap in said data stream wherein said first gap is bits in said stream for an unused address in said field programmable gate array;

determining whether encryption is enabled for said first gap;

inserting an encryption identifier into said first gap identifying whether encryption has been enabled;

encrypting bits in said stream of bits from a beginning of said first gap a prespecified number of bits at a time utilizing a prespecified set of bits as a bit mask, wherein:

the encrypting is a loop comprising:

selecting a next prespecified number of bits from the stream of bits as a selected set of bits;

toggling the specified set of bits from the selected set of bits; and repeating the selecting and the toggling until a second gap in said stream for an unused address in said field programmable gate array is encountered;

detecting the second gap;

ending encryption of bits in said stream of bits at a beginning of said second gap in response to detecting said second gap; and wherein the encrypting further comprise:
  encrypting a first portion of bits in said first gap from said begining of said first gap responsive to a determination that encrypting is enabled; and
  compressing data in a second portion of said first gap responsive to a determination that encrypting is not enabled.

2. The method of claim 1 further comprising:
  detecting an end of said bits stream; and
  ending encryption at the end of said bit stream.

3. The method of claim 1 further comprising:
  compressing data in said stream of bits in response to a determination that encryption is not enabled.

4. The method of claim 1, wherein said step of encrypting further comprises:
  inserting random bits into said at least one gap.

5. The method of claim 1, wherein said step of encrypting inserts non-random bits into said first gap.

6. A memory readable by a processing unit that stores instructions for directing said processing unit for encrypting bits in a data stream for programming a field programmable gate array, said instructions comprising instructions to:
  receive said data stream wherein said data stream is a string of bits;
  detect a first gap in said data stream wherein said first gap is bits in said stream for an unused address in said field programmable gate array;
  determine whether encryption is enabled for said first gap;
  insert an encryption identifier into said first gap identifying whether encryption has been enabled;
  encrypt bits in said stream of bits prom a beginning of said first gap a prespecified number of bits at a time utilizing a prespecified set of bits as a bit mask, wherein:
  the encrypting is a loop comprising:
    selecting a next prespecified number of bits prom the stream of bits as a selected set of bits;
    toggling the specified set of bits prom the selected set of bits; and
    repeating the selecting and the toggling until a second gap is encountered;
  detect the second gap, and
  end encrypting of bits in said stream of bits at a beginning of said second
  gap in response to detecting said second gap; and
  wherein said instruction to encrypt further comprise:
  encrypt a first portion of bits in said first gap from said beginning of said first gap responsive to a determination that encrypting is enabled, and
  compress data in a second portion of said first gap responsive to a determination that encrypting is not enabled.

7. The memory of claim 6 wherein said instructions further comprise:
  instructions for directing said processing unit to:
  detect an end of said bits stream, and
  end encryption at said end of said bit stream.

8. The memory of claim 6 wherein said instructions to encrypt further comprise:
  instructions for directing said processing unit to:
  compress data in said stream of bits in response to a determination that encryption is not enabled.

9. The memory claim 6, wherein said instructions to encrypt further comprise:
  instructions for directing said processing unit to:
  insert random bits into said at least one gap.

10. The memory claim 6, wherein said instruction to encrypt further comprise:
  instructions directing said processing unit to:
  insert non-random bits into said first gap.

11. An apparatus for encrypting a data stream used to program a field programmable gate array comprising:
  means for receiving said data stream wherein said data stream is a string of bits;
  means for detecting a first gap in said data stream wherein said first gap is bits in said stream for an unused address in said field programmable gate array;
  means for determining whether encryption is enabled for said first gap;
  means for inserting an encryption identifier into said first gap identifying whether encryption has been enabled;
  means for encrypting bits in said stream of bits from a beginning of said first gap a prespecified number of bits at a time utilizing a prespecified set of bits as a bit mask, wherein: the encrypting is a loop comprising:
    selecting a next prespecified number of bits from the stream of bits as a selected set of bits;
    toggling the specified set of bits from the selected set of bits and
    repeating the selecting and the toggling until a second gap is encountered;
  means for detecting the second gap; and
  means for ending encryption of bits in said stream of bits at a beginning of said second gap in response to detecting said second gap; and
  wherein said means for encrypting further comprises:
  means for encrypting a first portion bits in said first gap from said beginning of said first gap responsive to a determination that encrypting is enabled; and
  means for compressing data in a second portion of said first gap responsive to a determination that encrypting is not enabled.

12. The apparatus of claim 11 further comprising:
  means for detecting an end of said bits stream; and
  means for ending encryption at the end of said bit stream.

13. The apparatus of claim 11 further comprising:
  means for compressing data in said to a determination that encryption is not enabled.

14. The apparatus of claim 11, wherein said means for encrypting further comprises:
  means for inserting random bits into at least one gap.

15. The apparatus of claim 11, wherein said means for encrypting further comprises:
  means for inserting non-random bits into said first gap.

16. A method for decrypting a data stream used to program a field programmable gate array comprising:
  receiving said data stream wherein said data stream is a string of bits;
  detecting a first gap in said data stream wherein said first gap is bits in said stream for an unused address in said field programmable gate array;
  reading an encryption identifier in said first gap;
  determining whether encryption is enabled from said encryption identifier;
  decrypting bits in said stream of bits from a beginning of said first gap responsive to a determination that encryption is enabled, wherein:
  the decrypting is a loop comprising:
    selecting a next prespecified number of bits from the stream of bits as a selected set of bits;
    toggling a prespecified set of bits from the selected set of bits; and
    repeating the selecting and the toggling until a second gap is encountered;

detecting the second gap;
ending decryption of bits in said stream of bits at a beginning of said second gap in response to detecting said second gap; and
wherein said step of decrypting further comprises:
decrypting a first portion of bits in said first gap from said beginning of said first gap responsive to a determination that encrypting is enabled; and
decompressing data in a second portion of said first gap responsive to a determination that encrypting is not enabled.

17. The method of claim 16 further comprising:
detecting an end of said bits stream; and
ending decryption at the end of said bit stream.

18. The method of claim 16 further comprising:
decompressing data in said first gap responsive to a determination that encryption is not enabled.

19. The method of claim 16, wherein said step of decrypting further comprises:
removing inserted random bits from at least one gap.

20. The method of claim 16, wherein said step of decrypting further comprises removing non-random bits inserted into said first gap.

21. A memory readable by a processing unit that stores instructions for directing said processing unit for decrypting bits in a data stream for programming a field programmable gate array, said instructions comprising instructions to:
receive said data stream wherein said data stream is a string of bits,
detect a first gap in said data stream wherein said first gap is bits in said stream for an unused address in said field programmable gate array,
read an encryption identifier from said first gap;
determine whether encryption is enabled for said first gap from said encryption identifier,
decrypt bits in said stream of bits from a beginning of said first gap, wherein:
the decrypting is a loop comprising:
selecting a next prespecified number of bits from the stream of bits as a selected set of bits;
toggling a prespecified set of bits from the selected set of bits; and
repeating the selecting and the toggling until a second gap is encountered;
detect the second gap, and
end decrypting of bits in said stream of bits at a beginning of said second gap in response to detecting said second gap; and
wherein said instructions to decrypt further comprise:
decrypt a first portion of bits in said gap from said beginning of said first gap responsive to a determination that encrypting is enabled, and
decompress data in a second portion of said first gap responsive to a determination that encrypting is not enabled.

22. The memory of claim 21 wherein said instructions further comprise:
instructions for directing said processing unit to:
detect an end of said bits stream, and
end decryption at said end of said bit stream.

23. The memory of claim 21 wherein said instructions to decrypt further comprise:
instructions for directing said processing unit to:
decompress data in said stream of bits to a determination that encryption is not enabled.

24. The memory claim 21, wherein said instructions to decrypt further comprise:
instructions for directing said processing unit to:
remove random bits inserted into at least one gap.

25. The memory claim 21, wherein said instructions to decrypt further comprise:
instructions directing said processing unit to:
remove non-random bits inserted into said first gap.

26. An apparatus for decrypting a data stream used to program a field programmable gate array comprising:
means for receiving said data stream wherein said data stream is a string of bits;
means for detecting a first gap in said data stream wherein said first gap is bits in said stream for an unused address in said field programmable gate array;
means for reading an encryption identifier in said first gap;
means for determining whether encryption is enabled from said encryption identifier;
means for decrypting bits in said stream of bits from a beginning of said first gap responsive to a determination that encryption is enabled, wherein:
the decrypting is a loop comprising:
selecting a next prespecified number of bits from the stream of bits as a selected set of bits;
toggling a prespecified set of bits from the selected set of bits; and
repeating the selecting and the toggling until a second gap is encountered;
means for detecting the second gap;
means for ending decryption of bits in said stream of bits at a beginning of said second gap in response to detecting said second gap; and
wherein said means for decrypting further comprises:
means for decrypting a first portion of bits in said first gap from said beginning of said gap responsive to a determination that encrypting is enabled; and
means for decompressing data in a second portion of said first gap responsive to a determination that encrypting is not enabled.

27. The apparatus of claim 26 further comprising:
means for detecting an end of said bits stream; and
means for ending decryption at the end of said bit stream.

28. The method of claim 26 further comprising:
means for decompressing data in said first gap responsive to a determination that encryption is not enabled.

29. The method of claim 26, wherein said means for decrypting further comprises:
removing inserted random bits from at least one gap.

30. The method of claim 26, wherein said means for decrypting further comprises removing non-random bits inserted into said first gap.

* * * * *